May 11, 1971 A. K. THORSRUD 3,578,544

REINFORCED MICROPOROUS LAMINATES

Filed Jan. 18, 1968

INVENTOR.
A. K. THORSRUD
BY
Young + Grigg
ATTORNEYS

United States Patent Office 3,578,544
Patented May 11, 1971

3,578,544
REINFORCED MICROPOROUS LAMINATES
Agmund K. Thorsrud, Brussels, Belgium, assignor to
Phillips Petroleum Company
Filed Jan. 18, 1968, Ser. No. 698,831
Int. Cl. B32b 5/12, 5/18
U.S. Cl. 161—59                                6 Claims

ABSTRACT OF THE DISCLOSURE

A reinforced microporous sheet is formed by distributing fibers and blowing agent in a softened elastomeric or thermoplastic material, forming a sheet of material having unidirectionally oriented fibers, laminating two or more sheets such that the fibers in each sheet are at an angle to those in adjacent sheet(s), and foaming during or subsequent to the preparation of the sheet or laminate.

BACKGROUND OF THE INVENTION

This invention relates to laminates of a reinforced microporous sheet that are suitable, for example, as a substitute for leather.

The development of synthetic materials that are suitable for use in applications where leather has traditionally been used has been the subject of work by a number of researchers. Early workers in the field found that synthetic materials could not be directly substituted for leather in a number of applications because of the lack of porosity of these materials. For example, unmodified synthetic resins are generally unsuitable as leather substitutes in shoes because the perspiration from the feet cannot escape to the atmosphere through the impermeable plastic material. As the art progressed, researchers found a number of ways to create microporous holes through plastic sheet materials and have thereby overcome a major difficulty in the use of synthetic sheet materials.

An additional problem which faced workers in the field was the fact that rubbery polymers, and some non-rubbery synthetic thermoplastic materials will change dimensions over a period of time due to a gradual elongation or compression setting of the material. This "growth" of the elastomeric or thermoplastic material is particularly noticeable when such materials are used for shoe soles and heels. After a period of wear, these soles or heels will become enlarged and protrude beyond the body of the shoe.

An additional problem in the use of these materials in shoe manufacturing arises from the fact that shoe parts are generally sewed together. However, under the stress of normal wear of shoes, the stitching used to construct the shoes tends to pull through the sheet material and cause failure of the sewn joint.

It is therefore an object of this invention to provide a process for manufacturing laminates of reinforced microporous sheet material that are suitable as a leather substitute and are not subject to the disadvantages mentioned above.

The foamed, reinforced laminates of the invention can also be used in a number of other applications, such as in industrial doors, seals, gaskets, briefcases, suitcases, upholstery, flooring, wall covering, battery cell dividers, filters, and the like. It is also within the scope of the invention to postcure the sheets or laminates having open cell structure to densify and form a breathing leather-like material.

SUMMARY OF THE INVENTION

According to my invention, a reinforced microporous sheet is formed by distributing reinforcing fibers and a blowing agent in a softened elastomeric or thermoplastic material, forming a sheet of this material, unidirectionally orienting the fibers in the sheet and in order to obtain multi-directional reinforcement, laminating two or more sheets with the fibers at an angle to each other. Foaming is effected during or subsequent to the preparation of the sheet or laminate.

DESCRIPTION OF THE DRAWINGS

One process for forming the sheet of my invention is shown in FIG. 1. A softened elastomeric or thermoplastic material containing reinforcing fibers is calendered into sheets by means of calender rolls 1, 2, 3. The action of the calendering rolls tends to cause the fibers in the thermoplastic material to become unidirectionally oriented as is known in the art.

The elastomeric or thermoplastic material is introduced as mass 4 between calender rolls 1 and 2. It emerges from the calender rolls as a sheet 6 having dispoesd therein substantially unidirectionally oriented fibers. The fibers are oriented in a direction transverse to the axis of the calender rolls.

A blowing agent can be incorporated into the elastomeric or thermoplastic material either prior to the introduction of the material to the calender rolls, or it can be dusted onto the thermoplastic material in the nip between calender rolls 2 and 3. The blowing agent is gasified, generally by decomposition, by exposure to temperatures above the gasification temperature of the agent. In order to accomplish this gasification and consequent foaming of the elastomeric or thermoplastic sheet material, sheet 6 is optionally passed through heaters 7. During passage through the heaters, the sheet reaches a temperature above te gasification temperature of the blowing agent. The resultant gas formation within the polymer causes foaming of the sheet, and a foamed sheet 8 having unidirectionally oriented fibers emerges from heaters 7.

Figure 1:
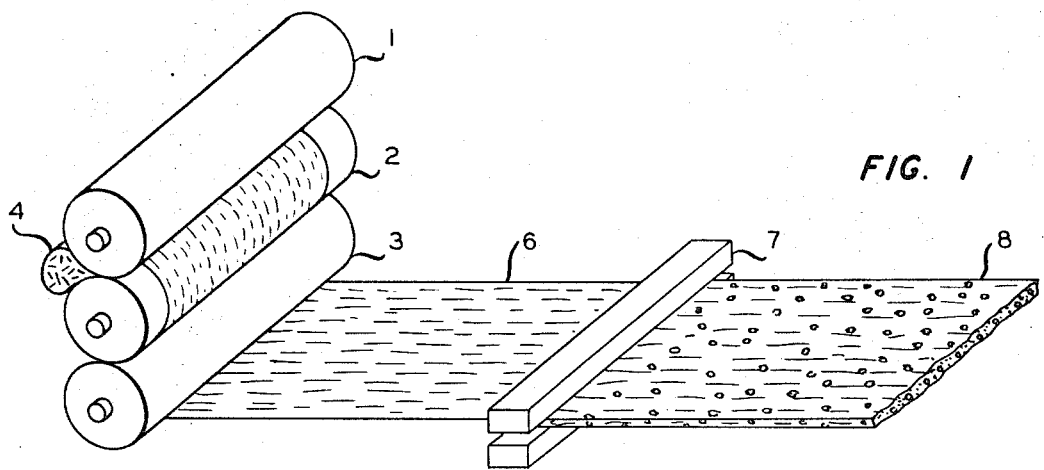
Figure 2:
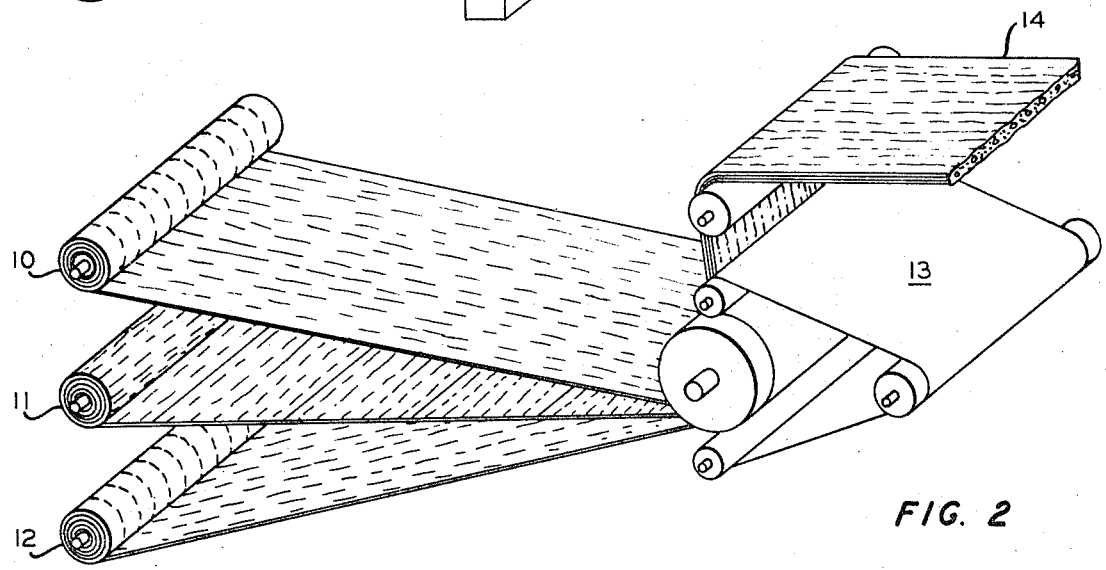

FIG. 2 shows one way in which laminates can be formed from the sheets containing unilaterally oriented fibers. Sheets containing the unilaterally oriented fibers as produced in the apparatus of FIG. 1, optionally foamed, are fed from rolls 10 and 12 together with a sheet from roll 11 made by cutting and joining a sheet as produced in FIG. 1 such that the fibers are at an angle to those in sheets 10 and 12 to a rotocure 13 to form a finished laminate 14. As indicated earlier, the sheets can be foamed prior to laminating, during laminating, or after laminating, by suitable choice of foaming agent and operating temperatures.

Figure 3:
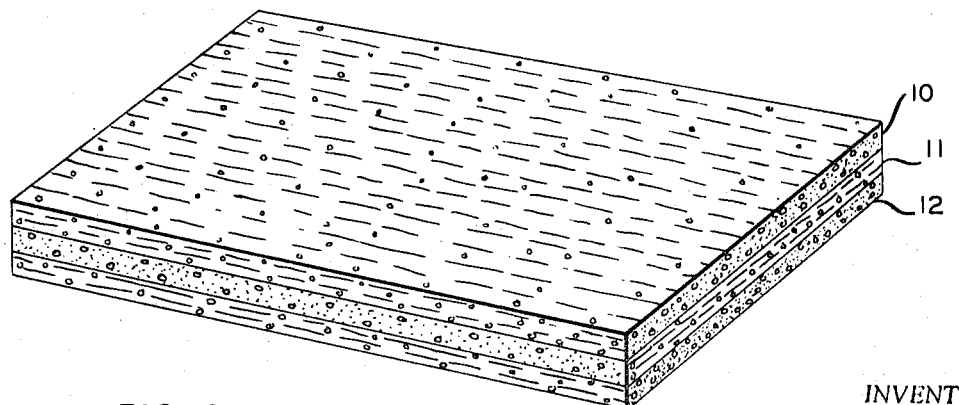

FIG. 3 shows a laminate of three thicknesses of the sheet. In the embodiment shown in FIG. 3, the sheets are laminated so that the direction of the fiber orientation in each sheet is 90° from adjacent sheets. It is also possible to form laminates with the orientation direction being at various angles, e.g., 10°–90° from each adjacent layer, in the different layers. For example, three or more layers can be laminated having the direction of fiber orientation in each layer at an angle of 60° to the other layers so that the triangular orientation is provided in the laminate. Such a laminate is quite resistant to any deforming stresses.

DESCRIPTION OF THE PREFERRED EMBODIMENTS

The materials to which my invention is applied can be either rubbery elastomers, thermoplastics, or mixtures thereof. The rubbery elastomers can be either natural or synthetic materials, and include natural rubber; polymerized olefins, such as ethylene-propylene or ethylene-propylene-diene; polymerized isoolefins, such as polyisobutylene; polymerized dienes and substituted dienes, such as polybutadiene, polyisoprene, polymethylisoprene, polymethylpentadiene, including rubbery polymers of haloprenes such as polychloroprene (neoprene); rubbery polymers of vinyl-substituted compounds, such as polyvinylethers, and polyacrylates; and block or random copolymers of compounds selected from these classes of compounds, such as butadiene-styrene, butadiene-acrylonitrile, and butyl rubber—which is a copolymer of isobutylene with a diene such as isoprene or butadiene. The thermoplastic materials are described in Modern Plastics Encyclopedia, which is issued annually, and include materials such as the olefin polymers and copolymers, the acetal polymers and copolymers, the acrylic polymers and copolymers, the halogenated olefin polymers, the sytrene polymers and copolymers, the polycarbonates, the vinyl polymers and copolymers, polyvinylidene fluoride, the urethane elastomers, and the like.

It is within the scope of the invention to incorporate other materials such as pigments, reinforcing agents, extenders, antioxidants, antiozonates, curing agents, and the like during or prior to the calendering and sheeting operation. It is apparent that curable compositions can be cured during or subsequent to the foaming operation on the sheet, or during or subsequent to the foaming of the laminate. Obviously, the curing and blowing agents are selected such that they are activated at the desired temperatures for the type of operation desired.

The fibers used to reinforce the sheet of my invention can be virtually and fibrous material, either natural or synthetic. For example, the fibers can be asbestos, metal, cotton, hair, glass, or the filament-forming synthetic organic polymers such as nylon, polyesters, rayon, cellulosics, or other known synthetic filamentary materials. The fibers can vary in length from fractions of an inch up to one or two inches, or even longer. Very long fibers can be used but will generally be broken if extensive mixing is used. It is within the scope of the invention to add materials that improve the adhesion between the fibers and the rubber compound. An example of such a material is the combination of a highly-reinforcing silica with resorcin resin and a formaldehyde donor.

The blowing agents that are used in the practice of my invention are those agents that will form a gaseous material at an elevated temperature. Such agents generally form a gas by chemical decomposition of the molecule. For use in my invention, the blowing agent must have a decomposition temperature that is above the calendering temperature of the elastomeric or thermoplastic material being used, but below the temperature at which the elastomeric or thermoplastic material will be degraded.

The blowing agents suitable for use in my invention include the azo compounds such as azobisformamide, azobisisobutyronitrile, and the like; the N-nitroso compounds such as N,N'-dimethyl-N,N'-dinitrosoterephthalamide, and the like; the sulfonyl hydrazides, such as benzenesulfonyl hydrazide, diphenylsulfon-3,3'-disulfonyl hydrazide, and the like; urea oxalate; the alkali metal carbonates and bicarbonates; and the like. These and other agents are well known to the industry, and are discussed, for example, in the annual Modern Plastics Encyclopedia. Mixtures of these materials can be used.

The temperature at which calendering of the elastomeric or thermoplastic material takes place will depend upon the particular material being used. Such calendering generally takes place at a temperature between about 100° F. and about 400° F.

The temperature of foaming of the polymer will also depend upon the particular elastomeric or thermoplastic material being used. The temperature must be high enough to cause complete decomposition of the blowing agent, and yet the temperature must be within a range in which the elastomeric or thermoplastic material is still relatively viscous so that the foam formed by decomposition of the blowing agent does not collapse due to escape of the gas bubbles. The conditions for satisfactory foaming of various materials are well known in the prior art.

The amount of blowing agent to be incorporated with the polymer should be sufficient to create an open cell foam so that there is a vapor transmission path completely through the sheet. The maximum limit of the amount of blowing agent to be used is determined by the desired strength of the ultimate foamed sheet. Usually, depending on the thickness wanted in the blown sheet and/or laminate, the blowing agent is used in a concentration of from 0.5 to 50, preferably 1 to 15, parts by weight per 100 parts of the elastomeric or thermoplastic material.

The amount of fibrous material added to the elastomeric or thermoplastic material will vary depending upon the ultimate use of the product, as well as the particular fibrous material being used. When using a relatively absorptive material, such as asbestos, from about 20 to about 150 parts per 100 parts of elastomeric or thermoplastic material can be incorporated. When using a non-absorptive material, such as glass, from about 10 to about 100 parts per 100 parts of elastomeric or thermoplastic material can be used. In general, it is desirable to use the maximum quantity of fibrous material which is consistent with good calendering operation.

The calendering operation will generally produce a sheet having a thickness of from about 2 mils to about 500 mils. The thickness of the sheet after foaming will depend upon the amount of blowing agent added. When using the concentrations of blowing agent stated above, the ultimate thickness of the sheet will be from about 3 mils to about 5000 mils.

To produce the laminates of the invention having bi-dimensional stability, two or more sheets are laminated together with their fiber axes of adjacent layers disposed at an angle to each other. Such laminates can be formed by thermal welding of the materials before, during or immediately after as they come from the blowing operation, or the sheets can be joined together by means of an adhesive. As has been pointed out, each sheet can be blown individually prior to laminating, as shown in FIG. 1, or the laminate can be blown during lamination, or the finished laminate can be blown.

The sheets of my invention will not suffer elongation or growth due to compression set in the direction of the fiber axis. A laminate, therefore, is dimensionally stable in two or more directions due to the angular disposition of the fibers in the various layers. Such laminates are, therefore, suitable for use in the manufacture of shoe soles or heels, as well as in other uses hereinbefore enumerated. Furthermore, the fibers which are incorporated in the sheets of my invention tend to prevent the stitching of such shoe parts from pulling through the elastomeric or thermoplastic material, resulting in a much stronger structure than the unreinforced elastomeric or thermoplastic sheeting.

EXAMPLE I

The following recipe is compounded and sheeted out using a 3-roll calender into sheets about 80 mils thick and 3 feet wide:

| | Parts by weight |
|---|---|
| Solprene 303 [a] | 75 |
| Polysar SS 260 [b] | 25 |
| Cumaron Resin [c] | 3 |
| Silene EF [d] | 45 |
| Suprex Clay [e] | 10 |
| Circosol 2 XH [f] | 1.5 |
| ZnO | 5 |
| Stearic acid | 2.5 |
| Solkafloc BW 200 [g] | 10 |
| Diethyleneglycol | 1 |
| Antox, Montaclere [h] | 1 |
| MBTS [i] | 1.5 |
| Sulfur | 2.8 |
| Celogen [j] | 4 |
| Glass Fibers, ½-inch | 12.7 |
| | 200.0 |

[a] Solprene is a trademark for Phillips' polymers. Solprene 303 is a solution-polymerized butadiene-styrene random copolymer, containing 48 weight percent styrene and having a Mooney viscosity of 44 (ML-4). This polymer was made by the process of U.S. Pat. No. 2,975,160 using the following recipe (4 batches made):

| | Parts by weight |
|---|---|
| Butadiene | 52 |
| Styrene | 48 |
| n-Hexane | 750 |
| Tetrahydrofuran | 3 |
| n-Butyllithium | 0.077, 0.075, 0.061, 0.10 |
| Initiation temperature, °F. | 118, 120, 123, 122 |
| Peak temperature, °F | 198, 202, 205, 200 |
| Total reaction time, hr. | 0.3, 0.4, 0.5, 0.3 |

Shortstopping was effected with 1 phr. of a mixture of $C_{16}$-$C_{18}$ saturated and unsaturated fatty acids, and 1 phr. of 2,6-di-tert-butyl-4-methylphenol was added as antioxidant. Recovery was by steam stripping and extruder drying.

[b] An emulsion-polymerized butadiene-styrene copolymer containing 60 percent styrene; polymer prepared by Polymer Corporation.
[c] A resin derived from coal-tar naphtha.
[d] Hydrated precipitated calcium silicate.
[e] Hydrated aluminum silicate.
[f] Special heavy hydrocarbon structures derived from petroleum.
[g] A finely-divided wood cellulose.
[h] A styrenated phenol made by Monsanto Chemicals Ltd., England.
[i] 2,2'-dibenzothiazyl disulfide.
[j] p,p'-Oxybis-(benzenesulfonyl hydrazide).

Three-layer laminates are made by the following techniques from 3-foot lengths of the sheet in which the axis of the fibers in the center layer of the laminate is at right angle to that of the fibers in the outer layers:

(A) The three sheets are joined, cured, and blown by heating for 10 minutes at 300° F.

(B) The three sheets are joined by heating 10 minutes at 200° F., the temperature is increased to 250° F. for 10 minutes to activate the blowing agent and effect blowing, and the temperature is further increased to 300° F. for 10 minutes to effect cure.

(C) The sheets are separately heated to 250° F. for 10 minutes to activate the blowing agent and effect blowing, are joined while still above 200° F., and are then heated further to 300° F. for 10 minutes to effect cure.

(D) The sheets are separately heated to 250° F. for 10 minutes to activate the blowing agent and effect blowing, are further separately heated to 300° F. for 10 minutes to effect cure, and are then joined using α-methylcyanoethylacrylate adhesive.

(E) The sheets are separately blown and cured by heating for 10 minutes at 300° F., and are then joined using α-methylcaynoethylacrylate adhesive.

In all cases the individual blown sheets are about 200 mils thick, and the finished blown laminate is about 600 mils thick.

Three rolls of unblown, uncured sheeting are prepared using the same recipe and calendering technique already described. These rolls are similar to those illustrated in FIG. 2. They are fed to a rotocure as illustrated in FIG. 2, in which the cylinder is heated to 300° F. and the contact time is 10 minutes. A blown, cured laminate having a thickness of about 600 mils is obtained.

Three rolls of blown, uncured sheeting are prepared using the same recipe and calendering technique already described, including the heaters 7 of FIG. 1 operating at 250° F. The rolls are fed to a rotocure as illustrated in FIG. 2 in which the cylinder is heated to 300° F. and the contact time is 8 minutes. A blown, cured laminate having a thickness of about 600 mils is obtained.

These various methods for preparing a finished blown, cured laminate illustrate the fact that proper control of temperature during the various steps permits making the laminates in a number of ways.

Portions of the various laminates are used as shoe heels and show no enlargement during use.

EXAMPLE II

The following recipe is compounded and sheeted out using a 3-roll calender into unblown sheets 26 mils thick:

| | Parts by weight |
|---|---|
| Polypropylene | 100 |
| Azobisformamide | 3 |
| Asbestos fibers, 1-inch | 26 |
| Cadmium red | 1 |
| | 130 |

A three-sheet laminate is formed by the process of FIG. 2, with the axis of fibers in the center layer of the laminate at right angle to that of the fibers in the outer layers. The blown laminate is 180 mils thick. It is formed into a suitcase having excellent appearance, scuff-resistance and strength.

Reasonable variation and modification are permissible within the scope of this disclosure, drawings, and the appended claims without departing from the spirit of my invention.

I claim:

1. A dimensionally stable reinforced microporous laminate comprising at least two layers of foamed microporous synthetic rubber elastomer or foamed microporous polyolefin thermoplastic material having an open cell structure extending therethrough containing unidirectionally oriented fibers dispersed therein and wherein the fibers of adjacent layers are disposed at an angle to each other.

2. A laminate according to claim 1 comprises three layers and wherein the fibers in the center layer are at a right angle to the fibers in the adjacent outer layers.

3. A laminate according to claim 1 wherein the foamed material is an elastomeric butadiene-styrene copolymer and said fibers are glass.

4. A laminate according to claim 1 wherein said thermoplastic material is polypropylene and the said fibers are asbestos.

5. A laminate according to claim 1 wherein each layer is from about 3 mils to about 5000 mils thick and each layer of the laminate contains from 10–150 parts of fiber per 100 parts of said foamed synthetic rubber elastomer or said foamed polyolefin thermoplastic material.

6. A shoe sole formed from a laminate according to claim 1 wherein the foamed material is an elastomeric butadiene-styrene copolymer.

References Cited

UNITED STATES PATENTS 1,215,064  2/1917  Ryan _____ 161—59

(Other references on following page)

References Cited

| | | | |
|---|---|---|---|
| 2,338,960 | 1/1944 | Nottebohm | 161—55UX |
| 2,677,008 | 4/1954 | Fairclough et al. | 161—159X |
| 2,719,802 | 10/1955 | Nottebohm | 117—140X |
| 2,822,627 | 2/1958 | Seiberling | 36—32 |
| 3,007,840 | 11/1961 | Wilcox | 161—55UX |
| 3,042,573 | 7/1962 | Roberts | 161—60UX |
| 3,483,069 | 12/1969 | Cairns et al. | 161—59 |

FOREIGN PATENTS

| | | | |
|---|---|---|---|
| 813,311 | 5/1959 | Great Britain | |
| | | | 161—Sponge Rubber Dig. |

WILLIAM A. POWELL, Primary Examiner

U.S. Cl. X.R.

156—78, 79, 242; 161—156, 159, 170; 264—54, 108